United States Patent [19]

Deckers et al.

[11] Patent Number: 5,536,788
[45] Date of Patent: Jul. 16, 1996

[54] CARBOXYL-CONTAINING ISOBUTENE COPOLYMERS

[75] Inventors: Andreas Deckers, Flomborn; Hans-Joachim Müller, Grünstadt; Roger Klimesch, Alsbach-Hähnlein; Eckehardt Wistuba, Bad Dürkheim; Heinz Plaumann, Limburgerhof; Erich Kolk, Bad Dürkheim; Gunther Isbarn, Tiefenthal; Karl-Heinz Fauth, Wattenheim; Joachim Krobb, Landau, all of Germany

[73] Assignee: BASF Aktiengesellschaft, Ludwigshafen, Germany

[21] Appl. No.: 490,031

[22] Filed: Jun. 13, 1995

Related U.S. Application Data

[62] Division of Ser. No. 300,185, Sep. 2, 1994, Pat. No. 5,473,022.

[30] Foreign Application Priority Data

Sep. 4, 1993 [DE] Germany .................. 43 29 905.9

[51] Int. Cl.⁶ .................. C08F 255/08; C08F 222/04; C08F 220/02
[52] U.S. Cl. .................. 525/301; 525/123; 525/130; 525/263; 525/267; 525/285; 525/381; 525/382; 525/327.6
[58] Field of Search .................. 525/285, 301, 525/123, 130, 381, 382, 327.6, 263, 267

[56] References Cited

FOREIGN PATENT DOCUMENTS

| 0234918 | 9/1987 | European Pat. Off. . |
| 0041314 | 3/1984 | Japan . |
| 0031512 | 2/1985 | Japan . |

Primary Examiner—Irina Zemel
Attorney, Agent, or Firm—Keil & Weinkauf

[57] ABSTRACT

Carboxyl-containing isobutene copolymers are obtainable
a) by cationic polymerization of a mixture of from 1 to 99 mol % of isobutene and from 99 to 1 mol % of a 2-methylalk-1-ene at less than 20° C. in the presence of a halogen-containing Lewis acid and
b) subsequent grafting of the isobutene copolymer obtainable in this manner with an α,β-ethylenically unsaturated carboxylic acid or carboxylic acid derivative at above 100° C. and in the presence of a free radical initiator.

Such carboxyl-containing isobutene copolymers are particularly suitable as adhesive raw materials or as sealing compounds.

3 Claims, No Drawings

CARBOXYL-CONTAINING ISOBUTENE COPOLYMERS

This is a divisional of application Ser. No. 08/300,185, filed Sep. 2, 1994, now U.S. Pat. No. 5,473,022.

The present invention relates to carboxyl-containing isobutene copolymers, obtainable a) by cationic polymerization of a mixture of from 1 to 99 mol % of isobutene and from 99 to 1 mol % of a 2-methylalk-1-ene of 5 to 8 carbon atoms at less than 20° C. in the presence of a halogen-containing Lewis acid and b) subsequent grafting of the isobutene copolymer obtainable in this manner with an α,β-ethylenically unsaturated carboxylic acid or carboxylic acid derivative at above 100° C. and in the presence of a free radical initiator.

The present invention furthermore relates to a process for the preparation of such carboxyl-containing isobutene copolymers and their conversion to crosslinked isobutene copolymers. The present invention also relates to the use of such isobutene copolymers as adhesive raw material and as a sealing compound.

Polyisobutenes are prepared by cationic polymerization at low temperatures and are suitable, inter alia, as raw materials for adhesives and as sealing compounds. Depending on the field of use, low molecular weight or high molecular weight polyisobutenes may be used (Ullmanns Encyklopädie der technischen Chemie, 4th edition, volume 19, pages 221–1980).

For certain applications, for example in sealing compounds, the bonding of the highly nonpolar polyisobutene chain to the generally polar substrates, which together with the polyisobutene form the sealing compound, is insufficient. Moreover, the viscoelastic behavior of the polyisobutene in sealing compounds frequently leads to deformations, some of which go substantially beyond the tolerable extent.

In the case of polyolefins, the bonding to polar substrates is generally achieved by grafting them subsequently with carboxyl-containing monomers. In the case of polyisobutene, however, this is not possible since the polyisobutene is not sufficiently reactive for such a reaction with carboxyl-containing monomers. All that is known is that copolymeres of isobutene with 2-methylalk-1-enes can be prepared by copolymerization by means of Ziegler catalysts (DE-A 20 14 394). However, the resulting isobutene copolymers are obtained as low molecular weight, viscous oils which, owing to their poor stability, cannot be used for many applications, for example as sealing compounds.

It is an object of the present invention to provide novel isobutene copolymers which do not have the disadvantages described and, owing to their high stability, are suitable for many applications.

We have found that this object is achieved by the novel isobutene copolymers described above.

In the process leading to the novel carboxyl-containing isobutene copolymers, a mixture of from 1 to 99 mol % of isobutene and from 99 to 1 mol % of a 2-methylalk-1-ene is first subjected to cationic polymerization. A mixture of from 50 to 98, in particular from 70 to 95, mol % of isobutene and from 50 to 2, in particular from 30 to 5, mol % of a 2-methylalk-1-ene is preferably used. The mol % used are to be understood as meaning that the sum of the amount of isobutene used and the amount of 2-methylalk-1-ene used is always 100 mol %. Instead of a 2-methylalk-1-ene, a plurality of different 2-methylalk-1-enes may also be used.

The 2-methylalk-1-enes used may be in particular 2-methyl-but-1-ene, 2-methylpent-1-ene, 2-methylhex-1-ene or 2-methyl-hept-1-ene, 2-methylpent-1-ene being preferably used.

The cationic polymerization of the mixture of isobutene and 2-methylalk-1-ene is usually carried out at less than +20° C., in particular less than 0° C. A preferred preparation process is BASF Aktiengesellschaft's belt process, in which the mixture of isobutene and the 2-methylalk-1-ene is subjected to cationic polymerization on a continuously moving steel belt in a solvent, preferably ethylene, in the presence of boron trifluoride (Ullmanns Encyklopädie der technischen Chemie, 4th edition, volume 19, pages 220–1980). The cationic polymerization of the mixture of isobutene and 2-methylalk-1-ene can also be carried out in conventional reactors of plastics technology, continuously, semicontinuously or batchwise, preferably in solution, in suspension or by mass polymerization.

The cationic polymerization a) of the mixture of isobutene and one or more 2-methylalk-1-enes is usually carried out in the presence of a halogen-containing Lewis acid, such as $BX_3$, $AlX_3$, $SnX_4$, $TiX_4$, $SbX_6$ or $FeX_3$, where X may be fluorine, chlorine, bromine or iodine. The halogen-containing Lewis acids initiate the cationic polymerization. Particularly preferably used halogen-containing Lewis acids are the halides of boron and of aluminum, preferably boron trifluoride, boron trichloride or aluminum trichloride. The halogen-containing Lewis acids are used in amounts of from 0.01 to 1, in particular from 0.05 to 0.1%, by weight, based on the monomers. It may be advisable to introduce the halogen-containing Lewis acids into the reaction mixture in the form of a 0.1–5 percent strength by weight solution in an inert solvent, for example in ethylene. The average polymerization times are usually from 0.01 to 5, in particular from 0.5 to 2, minutes.

The rate of the cationic polymerization process a) may furthermore be controlled by cocatalysts. Protic compounds, such as alcohols, carboxylic acids, etc., but preferably alcohols, are among the substances suitable for this purpose. Acceleration of the polymerization generally results in an increase in the molecular weight and a reduction in the catalyst requirement. The chain length of the isobutene copolymers can be influenced, particularly with regard to shortening, by, for example, the addition of olefins (eg. n-butene), halohydrocarbons, mercaptans and alkyl halides, it being possible for the reaction time and the catalyst requirement to increase, so that such regulators may simultaneously act as catalyst poisons.

By a suitable combination of both types of regulators, it is possible to prepare the novel isobutene copolymer having the desired molecular weight.

Depending on the subsequent intended use, solution viscosities (limiting viscosity number $I_0$) of the isobutene copolymers of from 50 to 2,000 ml/g can be established. This corresponds to an average molecular weight $\overline{M}v$ (viscosity average) of from 50,000 to about 10,000,000.

The copolymers obtained in this manner contain from 1 to 99, preferably from 50 to 98, in particular from 70 to 95, mol % of isobutene and from 99 to 1, preferably from 50 to 2, in particular from 30 to 5, mol % of one or more 2-methylalk-1-enes.

The copolymers are then converted into the novel carboxyl-containing isobutene copolymers by grafting b) with α,β-unsaturated carboxylic acids or carboxylic acid derivatives.

α,β-unsaturated carboxylic acids or carboxylic acid derivatives are used as graft monomers in the process leading to the novel isobutene copolymers. α,β-unsaturated carboxylic acids or carboxylic acid derivatives are to be understood as meaning both α,β-unsaturated mono- and dicarboxylic acids and the ester, anhydride or amide derivatives thereof. Maleic acid, fumaric acid, itaconic acid, acrylic acid, crotonic acid or the anhydrides thereof are among the substances preferably used, maleic anhydride being particularly suitable.

The grafting b) of the isobutene copolymers is preferably carried out at above 100° C., in particular at from 120° to 300° C., both in solution, for example as a 1–40 percent strength by weight solution in an apolar solvent, and in the melt. Apparatus suitable for this purpose are, for example, kneaders and extruders. The grafting b) is initiated by free radical initiators.

The free radical initiators used are usually organic azo compounds or organic peroxides, the latter preferably being used. Particularly preferred organic peroxide compounds have a half-life of one minute at from 60° to 200° C. Among these compounds, dicumyl peroxide, monocumyl (tert-butyl) peroxide, di-tert-butyl peroxide, 2,5-dimethyl-2,5-di-tert-butylperoxyhexane and 2,5-di-methyl- 2,5-di-tert-butylperoxyhex-3-yne are particularly noteworthy.

In a preferred embodiment of the process leading to the novel copolymers, the isobutene copolymer is metered together with the monomer to be grafted and the free radical initiator into a reactor which contains an inert solvent, and grafting is carried out at from 150° to 300° C. for from 0.5 to 30 minutes. The monomer to be grafted is preferably added in the liquid state, said monomer being either heated beforehand or dissolved in an inert solvent. The monomer to be grafted may also be added to the reactor after melting of the isobutene copolymer. The free radical initiator is usually added either in the absence of a solvent or as a solution in an inert hydrocarbon.

The grafted isobutene copolymers obtainable in this manner usually contain from 0.01 to 1.0% by weight of the monomer to be grafted, ie. of the $\alpha,\beta$-unsaturated carboxylic acid or its carboxylic acid derivative.

If the grafting reaction is carried out in a solution, the novel carboxyl-containing isobutene copolymers are isolated by precipitation.

In order to increase the yield, it may be advisable in the grafting reaction also to use small amounts of a vinylaromatic, for example styrene, in addition to a solvent.

The grafting reaction is preferably carried out in the presence of from 0.01 to. 1, in particular from 0.1 to 0.5%, by weight of the monomer to be grafted. The free radical initiator is usually added in amounts of from 0.01 to 1, in particular from 0.1 to 0.5%, by weight. The stated weights are based on the isobutene copolymer.

The novel carboxyl-containing isobutene copolymer is particularly suitable as an adhesive raw material.

It is also possible to react the novel, carboxyl-containing isobutene copolymers with organic crosslinking agents. This gives crosslinked isobutene copolymers which are likewise novel.

The crosslinking reaction is carried out in a conventional mixer, kneader or extruder at from 150° to 300° C., in particular from 180 to 250° C., and during a residence time of the reaction mixture of from 0.1 to 10, in particular from 0.5 to 5, minutes. The crosslinking agent may be introduced either in pure form or in the form of a solution in an inert solvent, for example in tetrahydrofuran, toluene, hexane or heptane.

Suitable crosslinking agents are the substances usually used in crosslinking reactions, in particular polyfunctional primary or secondary amines, amino alcohols, alcohols or epoxy-containing compounds. Compounds which contain at least two carbon atoms, for example ethylenediamine, diethylenetriamine, triethylenetetramine, diethanolamine, triethanolamine, dipropanolamine, tripropanolamine, ethyleneaminoethylamine, dimethylethylenediamine, diethylaminopropylamine, dimethylneopentanediamine, 1,8-octanediamine, 4,7-dioxadecane-1,10-diamine, polytetrahydro-furan-$\alpha$ $\omega$-diamine, dimethyldipropylenetriamine, neopentanediamine, dimethylaminobutanol, dodecyldiamine, hexamethylenediamine, diethanolamine, N,N-diethylaminopropylamine, 1,4-bis[2,3-epoxypropoxy]benzene, bis[2,3-epoxypropyl] ether and 1,2-5,6-bisepoxyhexane are preferred. Particularly preferred crosslinking agents are polyfunctional amines or polyfunctional isocyanates.

The organic crosslinking agent is usually added to the isobutene copolymer in amounts of from 0.5 to 500, preferably from 1 to 300, mol %, based on the content of the grafted comonomer.

It is also possible to carry out grafting and crosslinking in a single step and in one mixing apparatus, which is considerably cheaper in terms of process engineering.

The crosslinked isobutene copolymers, which are likewise novel, are mechanically very stable materials and also possess, inter alia, high tensile strength and high elongation at break. They are particularly suitable as adhesive raw materials and as sealing compounds.

EXAMPLES 1 TO 4 AND COMPARATIVE EXAMPLES A AND B

Example 1

Preparation of an isobutene copolymer

A mixture of 90 g of liquid isobutene (93.1 mol %) and 10 g of 2-methyl-pent-1-ene (6.9 mol %) was cooled to −104° C. by adding 350 g of liquid ethylene. Thereafter, first 0.1% by weight, based on the comonomers, of boron trifluoride in the form of a 1% strength by weight solution in ethylene and then 0.1 g of isobutanol were added to this solution, with the result that the polymerization was initiated. After 20 seconds, the cationic polymerization had ended and the unconverted comonomers and the ethylene were allowed to evaporate off. This gave a copolymer comprising 93.1 mol % of isobutene and 6.9 mol % of 2-methyl-pent-1-ene and having a limiting viscosity number $I_0$ of 98 ml/g, corresponding to a viscosity average $\overline{M}v$ of 255,000.

Example 2

Grafting of the isobutene copolymer 9.5 g of the copolymer obtained from Example 1 and 0.5 g of maleic anhydride were dissolved in 90 g of isododecane at 170° C. 0.25 g of 2,5-dimethyl-2,5-di-(tert-butylperoxy)-hexane was added to this solution, and the reaction was allowed to continue for 1 hour at this temperature. Cooling and precipitation in acetone gave a carboxyl-containing isobutene copolymer containing 0.16% by weight of maleic anhydride.

Comparative Example A 0.5 g of maleic anhydride was added to 9.5 g of isobutene homopolymer having a limiting viscosity number $I_0$ of 103 ml/g, corresponding to a viscosity average $\overline{M}v$ of 350,000, this procedure being carried out similarly to Example 2. The precipitated polymer contained no chemically bonded maleic anhydride.

Example 3

In a twin-screw extruder (ZSK-30 from Werner & Pfleiderer), 10 kg per hour of the isobutene copolymer obtained from Example 1 were continuously plasticated, ie. melted, and were reacted with 0.5% by weight of maleic anhydride at 200° C. In a devolatilization zone downstream of the reaction zone of the extruder, the reaction mixture was freed from unconverted maleic anhydride. A carboxyl-containing isobutene copolymer containing 0.19% by weight of maleic acid was obtained.

Comparative Example B

The isobutene homopolymer of Comparative Example A was reacted with 0.5% by weight of maleic anhydride as described in Example 3. The discharged polymer contained no chemically bonded maleic anhydride.

Example 4

Crosslinking of the grafted isobutene copolymer

In a 2-paddle kneader from Brabender, 50 g of the grafted isobutene copolymer obtained in Example 2 were first kneaded at room temperature and then crosslinked. During the actual crosslinking, the crosslinking agents stated in the table below were then added over a period of 5 minutes, and crosslinking was effected in each case in the course of 10 minutes. Thereafter, the crosslinked isobutene copolymer obtained was discharged and was pressed between two Teflon films (1 mm apart) to determine the tensile strength and elongation at break according to DIN 53,504 at 80° C. The viscoelastic behavior of the film samples was assessed visually.

The table below shows that the crosslinked isobutene copolymers (samples No. B–F) have in particular a substantially higher elongation at break and reduced viscoelastic behavior compared with the uncrosslinked, merely grafted isobutene copolymer (sample No. A).

TABLE

| Sample No. | Additive [% by wt.] | Tensile strength [N/mm$^2$] | Elongation at break [%] | Viscoelastic behavior* at RT |
|---|---|---|---|---|
| A | — | ~0 | 355 | 5 |
| B | TEA 0.5 | 0.1 | 640 | 2 |
| C | TEA 1.0 | 0.1 | 750 | 1 |
| D | TEA 0.5 | ~0 | 868 | 4 |
| E | PI 0.5 | 0.1 | 1,142 | 3 |
| F | PI 2.0 | 0.1 | 1,311 | 3 |

*Viscoelastic behavior at room temperature (RT):
Viscoelastic behavior:
1 = not viscoelastic
5 = highly viscoelastic
TEA = triethanolamine
PI = polyisocyanate (Basonat ® FDS 3391, registered trademark of BASF)

We claim:

1. A crosslinked isobutene copolymer, obtained by reacting a carboxyl-containing isobutene copolymer with an organic crosslinking agent, said carboxyl-containing isobutene copolymer being obtained by
    a) the cationic polymerization of a mixture of from 1 to 99 mo. % of isobutene and from 99 to 1 mol % of a 2-methylalk-1-ene of 5 to 8 carbon atoms at less than 20° C. in the presence of a halogen-containing Lewis acid and
    b) subsequent grafting of the isobutene copolymer obtained in step a) with an α,β-ethylenically unsaturated carboxylic acid or ester, anhydride or amide derivatives of α,β-ethylenically unsaturated carboxylic acid at above 100° C. and in the presence of a free radical initiator.

2. A crosslinked isobutene copolymer as defined in claim 1, wherein polyfunctional amines or isocyanates are used as organic crosslinking agents.

3. A crosslinked isobutylene copolymer as defined in claim 1 wherein the reaction of the carboxyl-containing isobutene copolymer with the organic crosslinking agent is carried out at from 150° to 300° C.

* * * * *